(12) United States Patent
Li et al.

(10) Patent No.: US 7,500,189 B2
(45) Date of Patent: Mar. 3, 2009

(54) METHOD AND SYSTEM FOR GENERATING COLORS USING CONSTRAINED COLOR PROPERTIES

(75) Inventors: Barn-Wan Li, San Jose, CA (US); Da Hye Huh, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 11/080,870

(22) Filed: Mar. 14, 2005

(65) Prior Publication Data

US 2006/0206812 A1  Sep. 14, 2006

(51) Int. Cl.
G06F 17/00 (2006.01)
(52) U.S. Cl. ........................................ 715/275; 345/593
(58) Field of Classification Search ................ 715/256, 715/275; 345/593
See application file for complete search history.

(56) References Cited

U.S. PATENT DOCUMENTS

| | | | |
|---|---|---|---|
| 5,751,450 A * | 5/1998 | Robinson | 358/504 |
| 6,734,871 B2 * | 5/2004 | Weil et al. | 345/619 |
| 6,870,550 B1 * | 3/2005 | Schuster et al. | 345/639 |
| 2002/0165881 A1 * | 11/2002 | Shelton | 707/526 |
| 2003/0231185 A1 * | 12/2003 | Kupersmit | 345/589 |
| 2004/0128621 A1 * | 7/2004 | Orihara | 715/528 |
| 2005/0047654 A1 * | 3/2005 | Newman et al. | 382/167 |
| 2005/0146537 A1 * | 7/2005 | Yamakado et al. | 345/629 |
| 2006/0066627 A1 * | 3/2006 | Gerhard et al. | 345/593 |
| 2006/0077494 A1 * | 4/2006 | Kanzaki et al. | 358/537 |
| 2006/0136819 A1 * | 6/2006 | Tolle et al. | 715/523 |

* cited by examiner

Primary Examiner—Stephen S Hong
Assistant Examiner—Adam M Queler
(74) Attorney, Agent, or Firm—Merchant & Gould PC

(57) ABSTRACT

Generally, the present invention provides embodiments of systems and methods for extrapolating formats to create pleasing format templates. In an exemplary embodiment, a method for creating a color template for a document comprises receiving at least one color for the document. Then, the colors received become constraints of at least one document parameter. A color template is then selected and automatically applied to the constrained document parameters to extrapolate one or more other colors for the unset color parameters. Finally, the color template with the extrapolated colors is provided with the received colors and the extrapolated colors.

19 Claims, 6 Drawing Sheets
(4 of 6 Drawing Sheet(s) Filed in Color)

METHOD AND SYSTEM FOR GENERATING COLORS USING CONSTRAINED COLOR PROPERTIES

COPYRIGHT NOTICE

As per 37 CFR 1.71(e), a portion of the disclosure of this patent document contains material which is subject to copyright protections. The copyright owner has no objection to the facsimile reproduction by anyone of the patent document of the patent disclosure, as it appears in the Patent and Trademark Office patent file or records, but other wise reserves all copyrights whatsoever.

TECHNICAL FIELD

The present invention relates generally to the creation and editing of graphical presentations. More particularly, the present invention relates to the formatting of visual presentations in computer graphics applications or programs.

BACKGROUND OF THE INVENTION

Computer systems and their related software applications have allowed many people to compile information easily into documents that convey information. Documents may have many different forms, such as text documents, graphical presentations, spreadsheets, etc. As the software applications that create the documents add features and functionality, users can more elegantly and easily format the documents to present the information more effectively and efficiently.

One popular method of formatting documents to better convey information is to change the appearance of the content within the document. As such, some document applications include style templates to aid in formatting the appearance of content within a document. The style templates are a set of styles that can be assigned to different portions of the document. Each portion with the same style assignment is attributed the same formats. A popular format to use with the style templates is color. Unfortunately, using color with style templates is an inflexible process.

Some document applications may provide a preset color palette to use with style template. Unfortunately, the preset color palette offers little ability for the user to set colors and provide an individual and unique document. In general, document applications allow the user to manually set the color settings for portions of the document. However, a user may need several colors. The user may know one, two, or three colors that they desire, but may not be able to complete a color palette because they are unsure what colors look pleasing with the colors they have chosen. Thus, the user must experiment by choosing a color for each portion of the document and determine if that color looks pleasing with the colors already chosen. This reiterative experimentation with colors is frustrating and time-consuming for most users. In addition, users with little knowledge of color theory often never arrive at a pleasing color palette and are forced to resort to a preset color palette. It is with respect to these and other considerations that the present invention has been made.

SUMMARY OF THE INVENTION

The present invention generally relates to new and improved embodiments of systems and methods for extrapolating formats to create pleasing format templates. In one embodiment, a method for creating a color template for a document comprises receiving at least one color for the document. Then, the colors received become constraints corresponding to at least one document parameter. An example color template is then selected and automatically applied to the constrained document parameters to extrapolate one or more other colors for other document parameters. Finally, the color template with the extrapolated colors is provided with the received colors and the extrapolated colors.

In another embodiment, a computer system for creating a color template for a document comprises a matching engine that receives constrained color parameters and extracts one or more example templates that relate to one or more of the constrained color parameters. In addition, the system comprises an algorithm engine that applies the color relationships in the one or more example templates to the constrained color parameters to extrapolate one or more color templates. Finally, the system comprises a template application module that receives a choice of a color template and automatically applies the colors to the document.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of exemplary embodiments of the invention, and to the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure will be thorough and complete and will fully convey the scope of the invention to those skilled in the art.

The present invention relates to new and improved embodiments of methods and systems for automatically generating formats based on one or more format constraints. The formatting may be any type of visual characteristic change, such as color, pattern, font type, etc. However, the present invention will be explained with embodiments applied to color, but the present invention is not limited to the embodiments described herein, as one skilled in the art will recognize. In embodiments of the present invention, a complete set of colors is generated and provided to a user to use in a document. It should be noted that a "complete" set of color refers only to a set of colors that provides the colors a user needs and not necessarily a color for every possibility that may arise when a user generates a document. One or more colors may be set as a baseline or initial set of colors from which to base the other colors. In one embodiment, the user provides one or more colors the use wants to use, and a complete set of colors, which are "pleasing" are generated based upon the user's color choices.

A document, as used herein, is any representation of information. In exemplary embodiments of the present invention, the document is a text document, a graphic diagram, such as a flow chart, an organizational chart, a pie chart, etc., a spreadsheet, or other type of document. The complete set of colors is applied to parts or the document. For example, one color may be applied to the text in the document, another color may be applied to the background of the document, and a third color may be applied to a graphic in the document. In order that each portion of the document look "pleasing" with the other portions, a complete set of pleasing colors is generated to apply to the different portions of the document.

Figure 1:
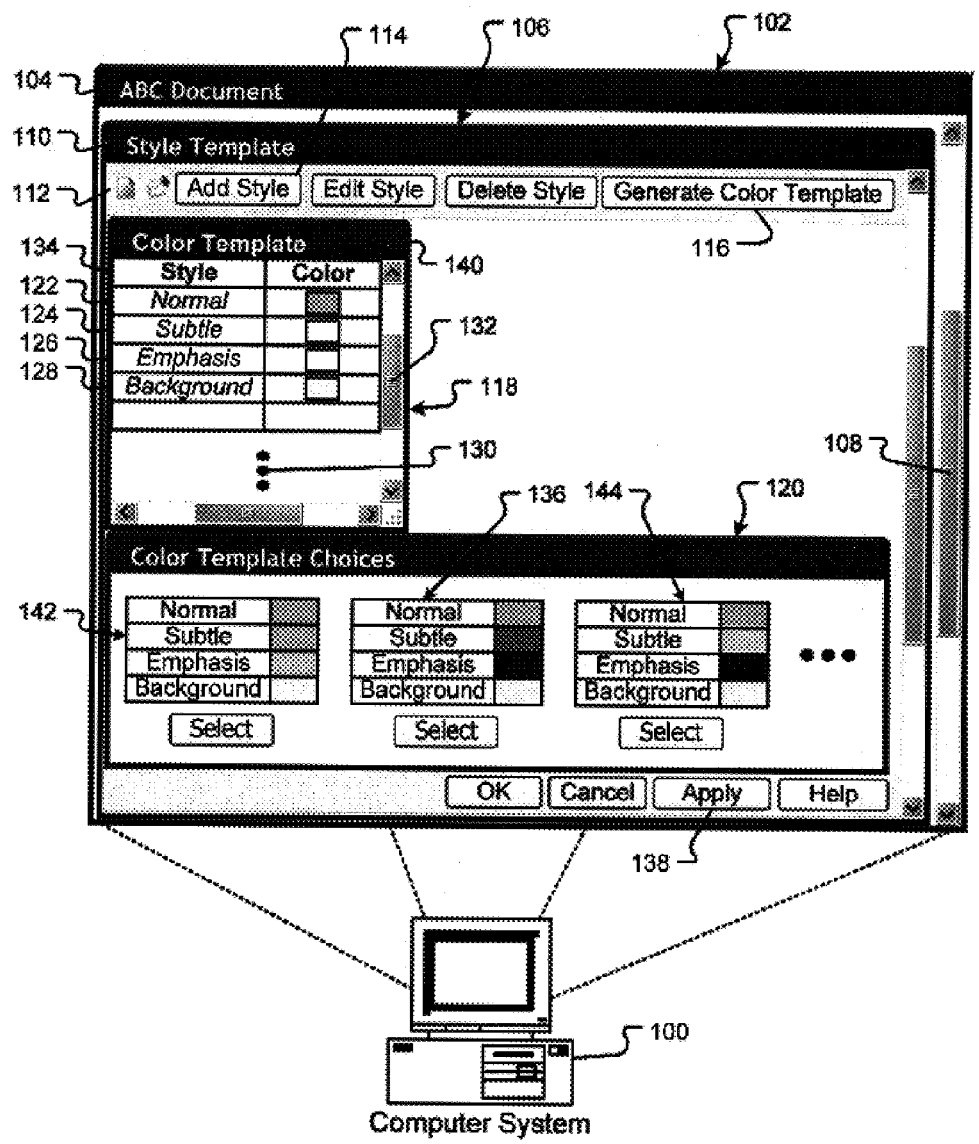
FIG. 1 is an exemplary embodiment of a user interface for automatically generating a color template from one or more user constrained colors according to the present invention.

A computer system 100 that may be used to automatically generate a complete set of colors and render the colors onto a display, in accordance with the present invention, is shown in FIG. 1. As used herein, a "computer system" shall be construed broadly and is defined as one or more devices or machines that execute programs for displaying and manipulating text, graphics, symbols, audio, video, and/or numbers. The computer system 100 displays information, such as display screen 102. The display screen 102 is enlarged to show details of the display. The display 102 relates to an oversimplified display of an example document application with the capability of automatically generating colors from one or more colors set by the user. Importantly, although display 102 displays colors, many other types of formats may be generated and displayed in accordance with the present invention and thus, the color example is not meant as a limitation, but merely as an illustration.

The display 102 shows a document 104 to which a user may wish to apply color. A document 104 may be formed from one or more portions. For example, if the ABC Document was a text document, the document may have a first portion that is titles or headers in the document, a second portion that is quoted text, a third portion that is emphasized text, a third portion that forms the background of the document behind any text, and/or a fourth portion that forms the headers and footers for the document. Any document may be broken into portions, as one skilled in the art will recognize. Each portion of the document may have certain properties. One of the properties may be color.

In embodiments of the present invention, window 118 is used to assign colors to certain portions of the document 104. The window 118 displays the various portions 122, 124, 126, and/or 128 of the document 104 with the properties that can be or do have an associated color. For instance, in the example in FIG. 1, the graphic may relate to a portion of text, a graphic, or a background. Moreover, the portions may be normal text, subtly highlighted graphics, emphasized text, or the background of the document 104. Obviously, all of these portions cannot have the same color property. Consequently, window 118 allows a user to set relatively easily one or more of the color properties for one or more of the portions 122, 124, 126, and/or 128. Moreover, once one or two of the color properties are set by the user (as shown in FIG. 1, the Normal and Background color properties have been selected and set), the color properties for the other portions (as shown in FIG. 1, the Subtle and Emphasis portions) may be automatically generated. Thus, the user need not have to determine a "pleasing" set of colors to use for all the portions of the document but can allow a set of colors be automatically generated from the user's one or more chosen color properties.

In embodiments of the present invention, one or more complete sets of colors are provided to the user from which to choose. For instance, window 120 provides examples of automatically generated sets of colors, such as set of colors 136, that the user may choose. Upon selecting a complete set of colors, those portions (such as the Subtle and Emphasis in FIG. 1) without a previously set color property are assigned the automatically generated color property. The portions in the document 104 with the newly assigned color properties are colored using the automatically generated colors. Thus, the user's document 104 will have the portions of the document 104 colored using a complete "pleasing" set of colors that were automatically generated from the user's set color properties in window 118.

Figure 2:
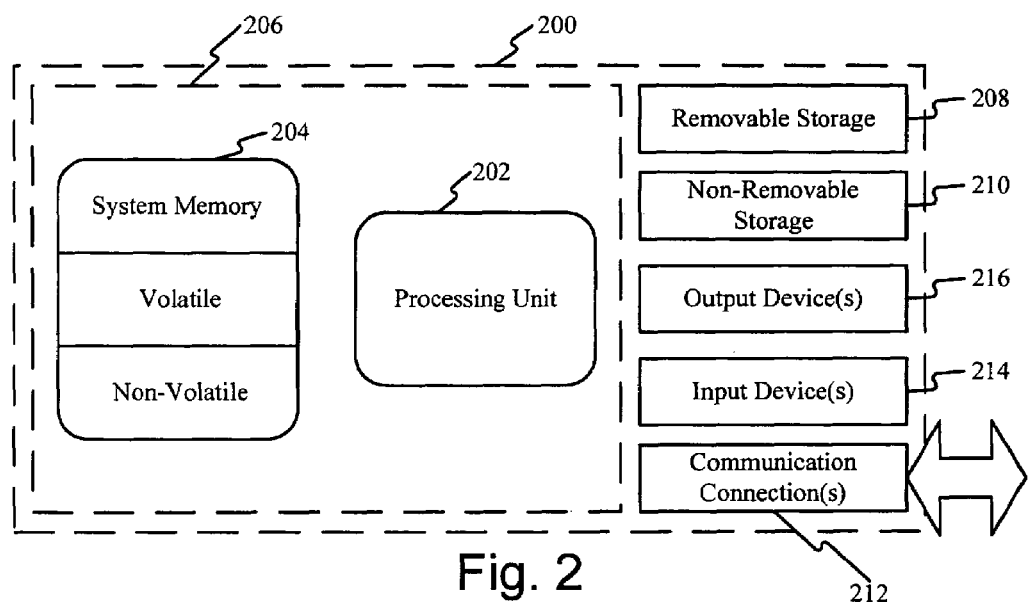
FIG. 2 is a functional diagram illustrating a computing environment and a basic computing device that can operate the color extrapolation system according to the present invention.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.), or some combination of the two. The most basic configuration of the computing device 200 is illustrated in FIG. 2 by dashed line 206. Additionally, device 200 may also have additional features or functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices 214 may help form the user interface 102 discussed above while devices 216 may display results 112 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media.

The computer device 200 may operate in a networked environment using logical connections to one or more remote computers (not shown). The remote computer may be a personal computer, a server computer system, a router, a network PC, a peer device, or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

Referring again to FIG. 1, the display 102 displays a document 104, entitled the "ABC Document." In embodiments of the present invention, style templates are used to identify the portions in the document 104. Style templates are well known in the art. In general, style templates allow a user to select a portion of a document and assign a style to the portion. A style may have more than one format property. In one embodiment, each style has a set of properties. For example, if the style template is used with a text document, the style template may have properties for text font, italics, bold, text size, etc. A style template is the collection of styles available to use in a particular document. The present invention is not limited to the use of style templates to identify portions of the document, as one skilled in the art will recognize. Rather, style templates are used to simplify the present description. Display 102 displays a style template window 106. There may be other windows for managing other information as indicated by scroll bar 108. A style template window 106 has a title bar 110 and a tool bar 112. Tool bar 112 provides user controls such as an add style control 114 and a generate color template control 116, among potentially many others. Such user interface controls are generally known in the art and are useful in managing certain types of information. Within the style template window 106, there are two sub-windows, such as color template window 118 and color template choice window 120 that are explained in more detail hereinafter.

The portion of the style template that has properties for color is called a color template. In embodiments, a color template window 118 is shown. In this particular example, color template window 118 displays a list of colors that either are assigned to or can be assigned to portions of the ABC document 104. For example, the properties for each style include a color setting. Color templates may be stored as data structures or distinct "objects" in a database or other data store. In embodiments of the present invention, the exemplary color template window 118 displays four style "portions" 122, 124, 126, and/or 128 and has been designed to display two properties associated with each style portion. Although four style portions are represented in the style template window 118, more style portions may be shown as indicated by the ellipses 130 and the scroll bar 132. The two properties shown in color template window comprise the name of the style in column 134 and the color property in column 140.

In order to create the color template window 118, a developer of the application used to create the ABC Document 104 may utilize one or more list controls. In an embodiment, the application used to display the window 118 was created from an operating system platform developed by Microsoft® Corporation. In such a case, the use of a control such as "ListBox" or others may be implemented to generate the window 118. ListBox, as well as other controls such as menu controls, are given the ability to manage a collection of items of arbitrary type.

The color template choice window 120 will be discussed in more detail below, but in general, the color template choice window 120 also displays color template objects 136, 142, and 144. In an embodiment, a user may choose an automatically generated color template that provides a complete set of colors. The automatically generated color templates in window 120 were generated using the user-set color template in window 118 shown in FIG. 1. When the user wants to automatically generate a color property, such as for the "Subtle" style portion 124 or the "Emphasis" style portion 126 assigned in document 104, the user can select a generate color template control 116 to display the color template choices window 120. The window 120 displays many color template choices, such as color template choice 136, that can provide extrapolated colors for the unset colors in the user's color template in window 118. Upon selecting a color template choice 136, 142, and/or 144 from the window 120, the user's color template in window 118 is updated and/or completed with the extrapolated colors. Upon selecting an apply control 138, the extrapolated color settings for each style 124 and 126 are applied to the portions of the ABC document 104 that are assigned those styles.

In further embodiments, the present invention relates to the provision of suggested color templates by extrapolating colors from a user-set color template in window 118. One or more of the colors set by the user in the color template in window 118 can be constrained, such that those colors do not change, as represented by the colors "Normal" and "Background" in window 120. However, the user-set colors are employed as a "base" set of colors to extrapolate new colors for unset styles, such as the "Subtle" color 124 and the "Emphasis" color 126. One or more color template choices, such as choice 136, are presented to the user to choose. Upon choosing a color template from window 120, the chosen color template becomes the color template for the user's document.

Figure 3:
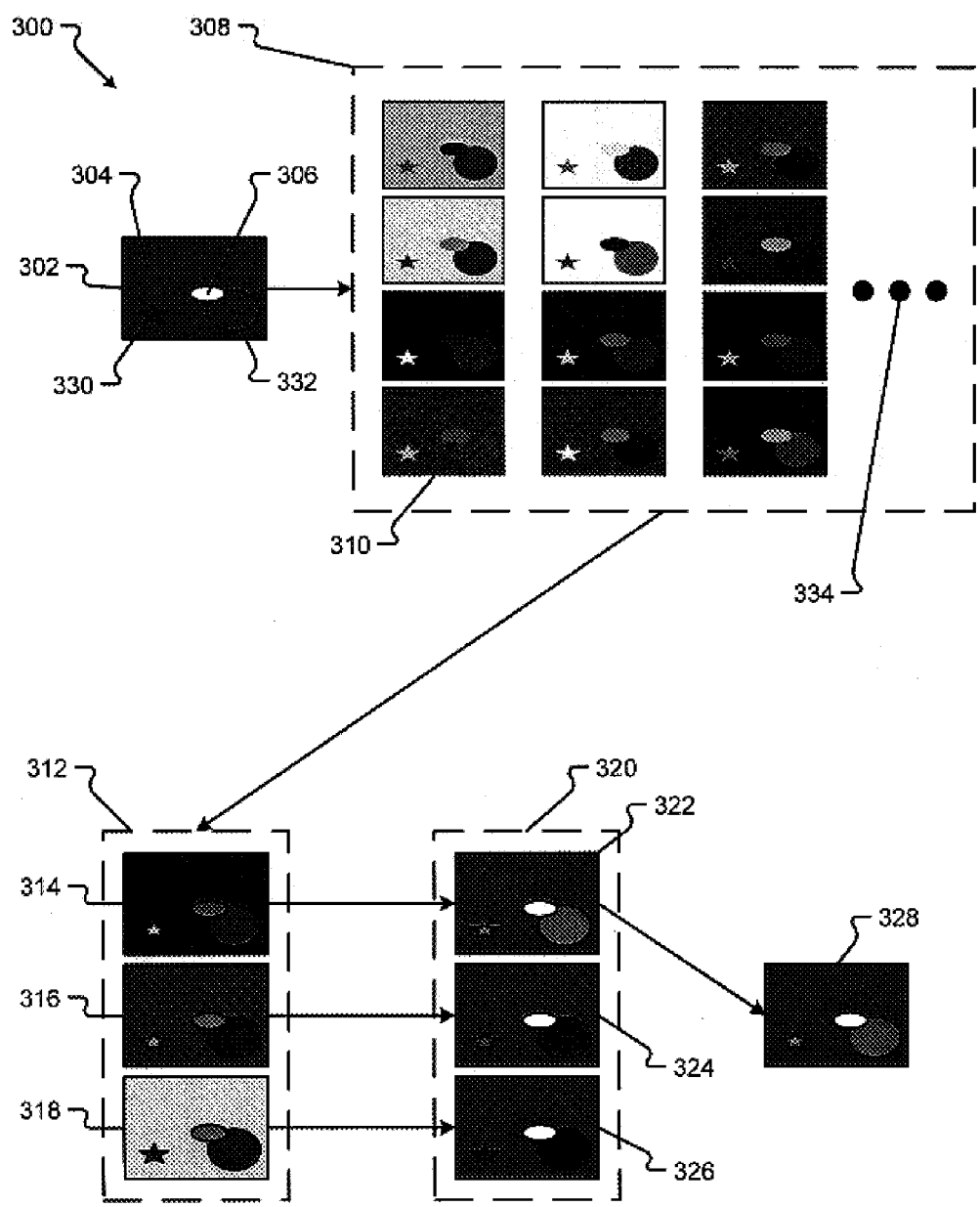
FIG. 3 is an exemplary embodiment of a process used by the system of FIG. 1 to generate a color template with extrapolated colors according to the present invention.

An exemplary embodiment of a process 300 for extrapolating colors to create a color template is shown in FIG. 3. In this embodiment, the user has provided a document with a color template input 302 with two styles having set colors. A first style setting 304 represents the style "background" and has a color setting of blue. A second style setting 306 represents the style "normal" and has a color setting of cream. Two other styles settings representing "emphasis"330 and "subtle" 332 do not have color settings and require extrapolated colors to complete the color palette or color template. The two set colors 304 and 306 are constrained, and thus, the two set colors 304 and 306 will not change.

The constrained colors 304 and/or 306 are used to compare to example color templates, such as template 310, in a template library 308. There may be more example color templates than those shown as represented by the ellipses 334. Graphic artists, artists, or other third parties that understand color theory and can generate color palettes that look pleasing create the example templates. In embodiments, the comparisons involve comparing the colors set for the same style in both the user-provided color template 302 and the example color template 310 in the library 308. In another embodiment, the comparisons involve comparing the relationship between hue settings of two styles, such as the relationship between color 304 and color 306, in the user-provided color template 302 to the relationship between hue settings of the same two styles in the example color template 310. The "example based" approach to extrapolating colors eliminates the need for complicated "rules-based" mathematical approaches to determine color palettes that look pleasing. Rather, a populated color template library 308 provides example color templates 310 that artists and other professional know look pleasing, and the color template examples 310 then provide the needed information to extrapolate new colors, as will be explained in more detail hereinafter.

The comparisons determine a set 312 of example templates 314, 316, and/or 318 that either have a color hue closely related to a color hue of one of the user-set and constrained colors or has a relationship between two or more colors similar to a relationship between two or more colors in the user-set and constrained color template 302. The example templates 314, 316, and/or 318 each have relationships between the color hue settings for the different styles. For example, in template 314, there is a certain relationship between the color for the "background"style and the color for the "subtle" style. How the relationship is determined or quantified is explained in more detail hereinafter with reference to FIG. 4 and FIG. 5. The color relationships are determined and applied to one or more of the constrained colors in the user-created color template 302 to extrapolate a color for the styles with an unset color, such as style colors 330 and or 332, in the user's color template 302. If the user requires a color setting for the "subtle"style, the relationship in the example template 314 between the "background" style color and the "subtle" style color is applied to the user-set "background" style color in the user's color template 302 to extrapolate a color for the unset "subtle" style 332. Applying the relationship determines a new color for the "subtle" style that will look pleasing because the relationship in the example template 314 provided a pleasing color template. The relationships may be applied to one style, such as the "background" color, or more than one style. In another embodiment, the user chooses which style color to use as the "base" color to extrapolate colors.

All of the relationships in the set of example templates 312 are determined and applied to the constrained colors to derive a set 320 of color template choices 322, 324, and/or 326. The user may then choose one of the color template choices 322, 324, and/or 326. For example, the user may select choice 322. Then, the color template is applied to the user's document to create a document 328 with the constrained and extrapolated colors applied to different portions of the document 328. In further embodiments, the color template is used for more than one document, where one or more of the documents are created using a different software application. For example, the color template created in a graphics software application is used for a document in a text editing software application.

Figure 4:
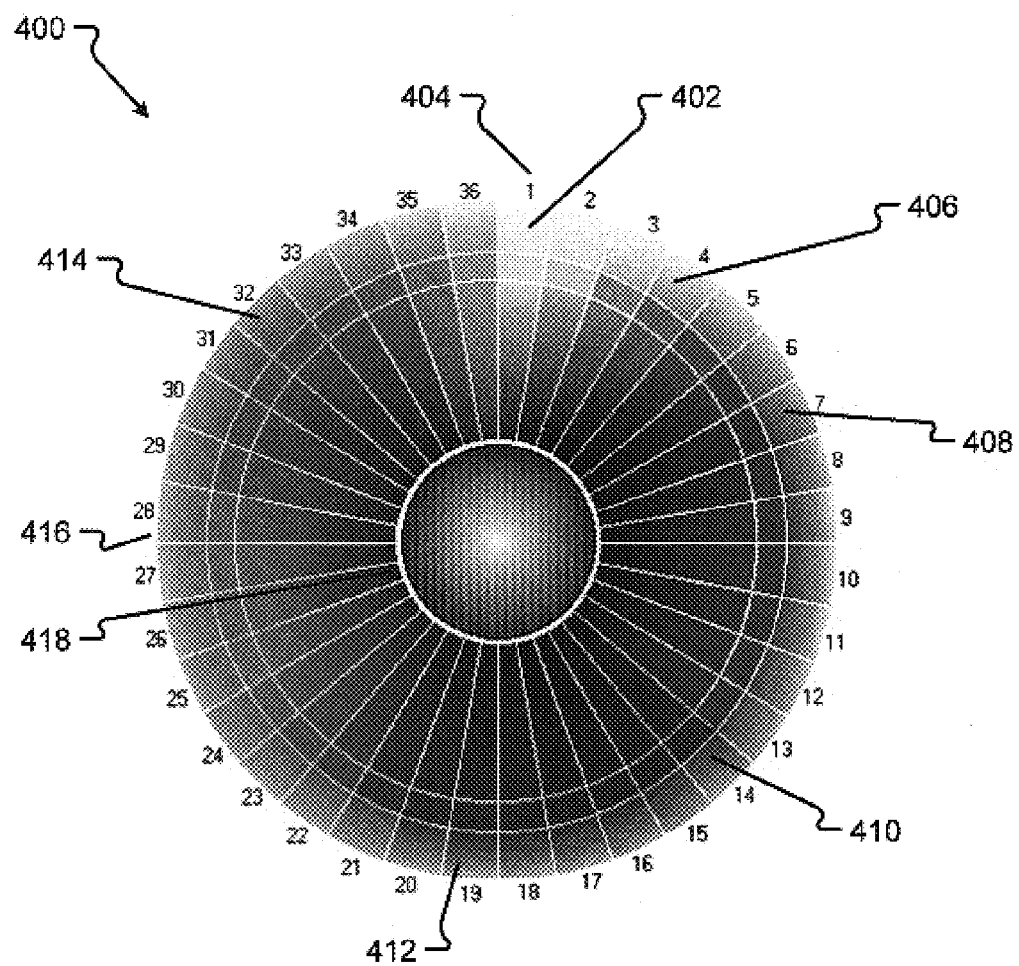
FIG. 4 is an exemplary embodiment of a color wheel used to determine and compare relationships between colors according to the present invention.

Before further explaining color extrapolation or the template creation system, a description of an exemplary instrumentality, the color wheel 400, used to extrapolate the colors should be described. In embodiments of the present invention, to extrapolate the colors, the color extrapolation system determines colors or color relationships using a color wheel. The color extrapolation system uses a color wheel to determine colors that will function with the colors constrained in the color template. A color wheel 400 is shown in FIG. 4. (The presented color wheel in FIG. 4 is the copyrighted material of Mr. Donald Jusko and was obtained from his website http://www.mauigateway.com/~donjusko/colorwheel.htm.)

In a computer environment, a hue identification number identifies the color. For example, a computer using 32-bit color can have over 16 million colors, with each color having its own hue identification number that equates to a certain hue of color. Output devices use the hue identification number to determine which color to display or print. In addition, all of the colors used in a computer system may be represented mathematically as a place on or within the color wheel 400. A color wheel 400 can represent all the colors in a prismatic spectrum. For example, in FIG. 4, the exemplary color wheel 400 starts with the color yellow 402, with an identification number 1 404, and proceeds through the different colors along the wheel 400, e.g., orange 406 then red 408 then purple 410 then blue 412 then green 414, until the colors revolve around to yellow 402 again. The exemplary embodiment of the color wheel 400 shows 36colors. However, some embodiments of color wheels may represent hundreds, thousands, or millions of hues arranged in a visual spectrum around the color wheel. As shown in FIG. 4, the color wheel 400 may also show the effect of saturation on the tint or shade of the hue. For example, the shade of the hue increases (becomes darker) as the wheel segment goes from the exterior 416 of the wheel 400 to the interior 418 of the wheel 400. Some computer systems represent colors with settings for hue, saturation, and luminescence. As one skilled in the art will recognize, the present invention can be employed to extrapolate saturation or luminescence values along with hue values.

In one embodiment, each color has a position identification number, represented in the exemplary color wheel 400 by an integer, which is the same as the identification number is this embodiment of the color wheel. For example, the color yellow 402 has the position identification number 1 404. In another embodiment, a particular hue setting can be selected by the position, in degrees, minutes, and seconds, around the color wheel. For example, yellow may be at 0° while red may be at 60° and green at 300°. Thus, every color used by the computer may have two identification numbers, one for the hue setting (e.g., the 32-bit color identification number) and one for the position of the color on the color wheel, stated in degrees, minutes, and seconds, the equivalent radian, or some other number. The arrangement of the color wheel can be important in extrapolating colors for the color templates described below.

Figure 5:
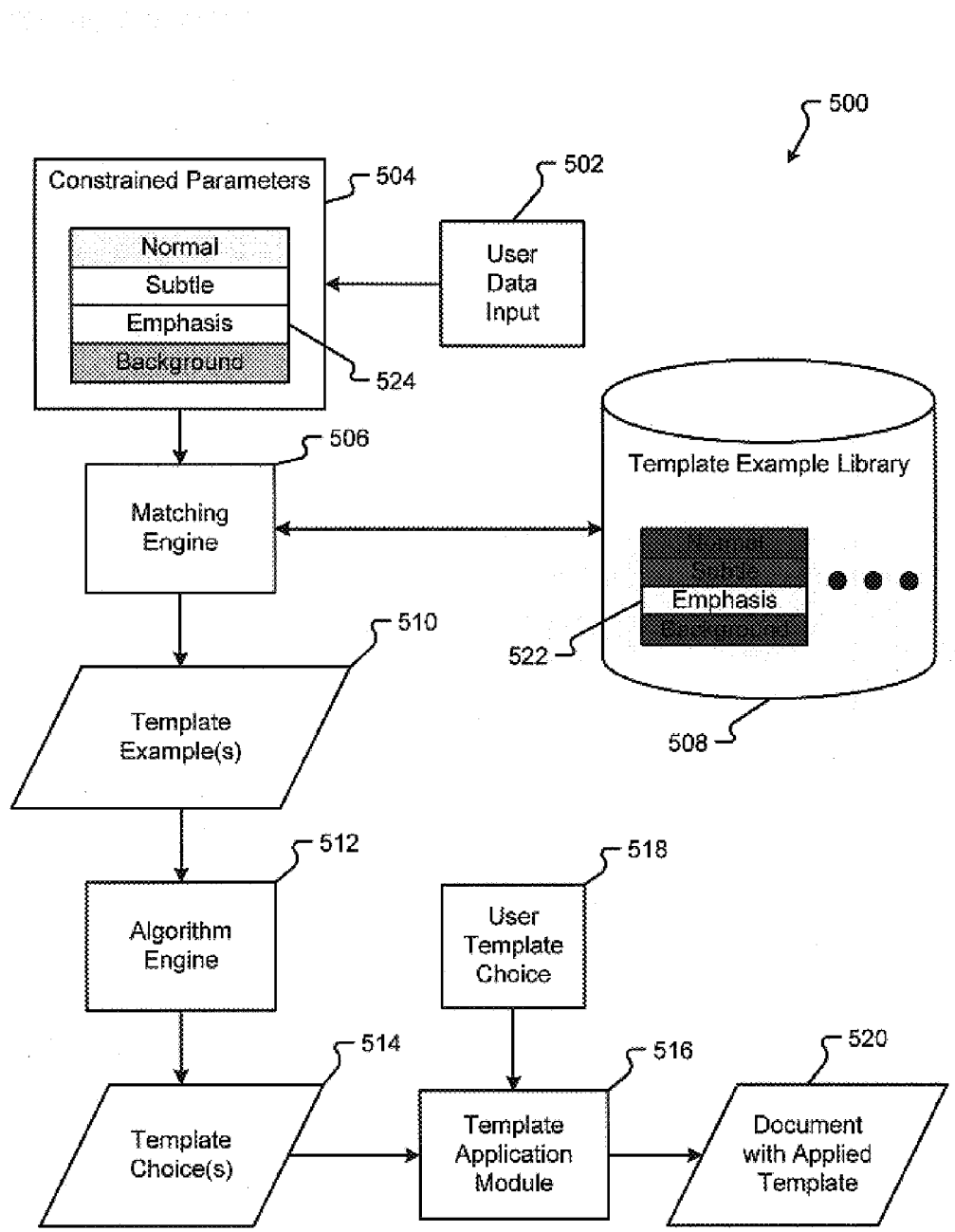
FIG. 5 is an exemplary embodiment of a color extrapolation system for automatically extrapolating color templates for a document according to the present invention.

An exemplary system 500 for creating a color template from one or more user input colors is shown in FIG. 5. Here, a user enters data 502 into the system 500. In one embodiment, the user interacts with a user interface (UI), such as a graphical user interface. The user may select colors or other formats in an application window, such as window 118. In one embodiment, the user assigns one or more colors to one or more styles.

In one embodiment, the user provides a user document that has one or more colors already set. For example, the user opens a company logo in a graphics program where one or more colors in the company logo apply to a style. The system 500 extracts the colors from the user document and assigns the colors to a style. Thus, the user input may be extracted from existing documents. This process allows a user to create pleasing color templates from existing materials, such as marketing materials.

In embodiments of the present invention, the user's input 502 becomes an incomplete color template 524, such as color template 118. However, the colors that are set by the user become constrained document parameters 504 and are constrained by the system 500. In other words, the colors set by the user do not change. In other embodiments, the user may choose one or more of the color settings to be constrained parameters. Regardless, the colors that are constrained parameters 504 are fed into a matching engine 506.

The matching engine 506, in embodiments of the present invention, compares the constrained color parameters to sets of example color templates, such as example color template 522, in a color template example library 508. In one embodiment, the matching engine 506 compares the hue value of a color for one or more styles to the hue value for the same styles in the example templates. In another embodiment, the matching engine compares the relationships between the hue settings for two or more styles to the relationships between the hue settings for the same styles in the example templates. After completing the comparison, the matching engine designates one or more template examples 510 that most closely match the colors or the relationships between the hue settings in the user-provided color template 524. These chosen template examples 510 are provided to an algorithm engine 512.

The algorithm engine 512 applies the relationships in the template examples 510 to the constrained color parameters 504 to extrapolate one or more colors that will complete the color template. In one embodiment, the algorithm engine 512 determines the type of relationship between the colors in the template example 510, such as complementary, split complementary, analogous, etc. The same relationships between the style colors in the example template 510 are applied to one or more constrained color parameters. The types of color relationships and the application of the color relationships are described more fully hereinafter. Regardless, the algorithm engine 512 creates one or more color template choices 514.

The template choices 514 provide a completed color template with extrapolated colors filling in the styles not assigned by the user. The template choices 514 can be presented to the user in the UI, such as in window 120. The user may review the choices and select a preferred color template choice. The template choice 518 is input into a template application module 516 along with the template choices 514. The template application module 518 extracts the chosen template from the template choices 514. Then, the template application module 518 sets the extrapolated colors to the unset styles in the user's color template. In some embodiments, the template application module 516 then automatically applies the color template to the document by coloring the portions of the document using either the user's input colors or the extrapolated colors. In other embodiments, the user makes a UI selection to apply the color template. Then, the template application module 518 outputs and displays a document with the applied template 520 to the user. In embodiments of the present invention, the colored document 520 is displayed in the UI, such as window 102.

In particular embodiments, the matching engine 506 matches template examples 522 in the template example library 508 to one or more constrained color parameters 504 in the user provided color template 524. To determine which template examples 510 to send to the algorithm engine 512, the matching engine 506 applies one or more mathematical algorithms to the template examples 522 to determine which of the template examples 522 is most closely related to the constrained parameters 504. In one embodiment, the matching engine 506 compares the hue value setting, explained above in conjunction with FIG. 4, between one of the constrained color parameters for a style and the hue setting for the same style in the template example 522. Thus, the matching engine searches for template examples 522 with a style that has a hue setting most closely alike the constrained color parameter for the same style, such as the "background" style color hue setting, the "normal" style color hue setting, etc.

In one embodiment, the matching engine calculates a "mathematical distance" between the constrained color parameter's hue value and the hue value in the template example 522. This type of calculation is an absolute value calculation of the hue value differences. In one embodiment, the matching engine 506 may use the Pythagorean theorem to calculate the distance between the hue values. The calculation would appear as follows:

$$\text{Dist.} = \sqrt{\text{Hue}_a^2 - \text{Hue}_b^2}$$

Where Dist. is the distance between the hue settings, $\text{Hue}_a$ is the hue value of the constrained color parameter, and $\text{Hue}_b$ is the hue value of the color of the same style in the example template 522. The calculation provides a mathematical value for the relative "closeness" of the two colors. The calculation can be applied to all example templates to find the example templates that have the closest color matches to the constrained color parameters.

In another embodiment, the matching engine 506 compares the relationships between the constrained color parameters 504 for two or more styles and the same relationships between colors settings for the same styles in the example templates 522. In one embodiment, the matching engine 506 uses the position of the hues on the color wheel to determine the relationship. For example, the color for the "normal" style may be a complementary color to the color for the "background" style. The complementary color relationship can be represented by an offset, represented in degrees, between the two color positions on the color wheel. For example, the color for the "normal" style may be 120° around the color wheel from the color for the "background" style. The relationship or offset is then compared to offsets of the color settings for the same styles in the example templates 522. To find a like color relationship between like styles, the matching engine searches for offsets that are the same or similar.

In embodiments of the present invention, the relationship comparison is also represented mathematically. In one embodiment, the relationship comparison involves finding a "mathematical distance" between the offsets. In a further embodiment, the distance is again represented by a Pythagorean theorem calculation as follows:

$$\text{Dist.} = \sqrt{\text{Offset}_a^2 - \text{Offset}_b^2}$$

In this embodiment, Dist. represents the distance, $\text{Offset}_a$ is the offset in degrees between hue values of two style colors in the constrained parameters 504, and $\text{Offset}_b$ is the offset in degrees between hue values of the same two style colors in the example template 522.

A color used in a computer system, such as computer 200, may be represented by a value for hue, saturation, and luminance, as is understood by those skilled in the art. In further embodiments of the present invention, one or all of these values may be used to determine the offset between two color values. For example, the offset between two colors is represented by the formula:

$$\textit{Offset} = \left(wt1 * \sqrt{(hueA^2 - hueB^2)}\right) + \left(wt2 * \sqrt{(satA^2 - satB^2)}\right) + \left(wt3 * \sqrt{(lumA^2 + lumB^2)}\right)$$

In this embodiment, Offset represents the offset between the two colors, wt1 is a first constant weighting factor, hueA is a hue value for the first color, hueB is a hue value for the second color, wt2 is a second constant weighting factor, satA is a saturation value for the first color, satB is a saturation value for the second color, wt3 is a third constant weighting factor, lumA is a luminance value for the first color, lumB is a luminance value for the second color. The weighting factors allow a developer to determine that one or more color parameters are more important. For example, changes in hue may be more obvious to a user than changes in saturation or luminance, and thus, weighting factor 1, wt1, may have a value of 0.7, while wt2 may equal 0.2 and wt3 may equal 0.1. One skilled in the art will recognize other formulas or methods for determine the relative closeness of colors or of relationships between colors.

The matching engine 506 provides one or more template examples 510. In one embodiment, the number of example templates 510 provided is set. For example, the matching engine 506 only provides three example templates 510. In another embodiment, the matching engine 506 provides all template examples 510 having a distance under a certain number, such as 10. One skilled in the art will recognize other methods of limiting the number of template examples 510 provided by the matching engine 506.

In other embodiments, the matching engine 506 determines whether to provide example templates 510 having closer absolute value comparisons or having closer relationship comparisons. In other words, the matching engine 506 can provide 12 templates that have hue settings close to a constrained color parameter but only two templates that have a relationship between style colors that is close to the relationship of the constrained color parameters. In one embodiment, a weighting system is used to determine whether to provide an example template with a close hue setting or a close relationship setting. For example, if the user is more interested in the color of the background rather than the relationship between the background color and the normal color, a weighting is applied to reflect this interest. Thus, the weighting provides a multiple of the distance of the hue setting comparisons of 75% and a multiple of the distance of the offset comparisons of 25%. In another embodiment, the weighting provides a more distributed set of template examples 510. For example, there may be three weightings, where each weighs the hue setting and the relationship differently. The first weighting may be 90% to 10%, the second weighting may be 50% to 50%, and the third weighting may be 10% to 90%. In this embodiment, three example templates are provided, which represent the best weighted comparison for each type of weighting.

Figure 6:
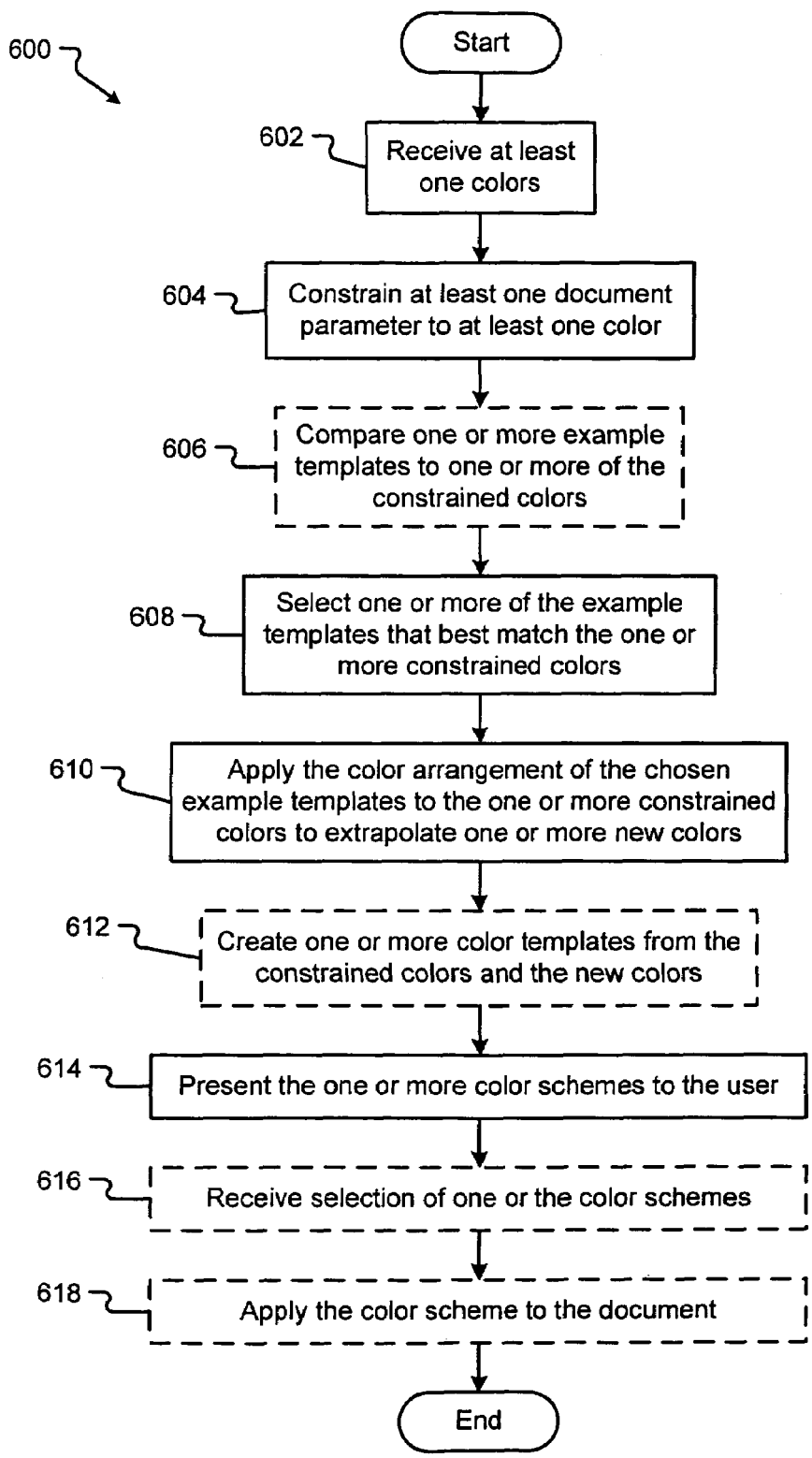
FIG. 6 is a flow diagram of an exemplary method for generating a color template according to the present invention.

An exemplary method 600 for extrapolating colors from one or more constrained color parameters to create a color template is shown in FIG. 6. First, receive operation 602 receives one or more color inputs from a user. In one embodiment, the user inputs one or more style color choices into a UI. Constrain operation 604 then constrains the one or more color parameters to the color input by the user. In one embodiment, a style attribute becomes a constrained color parameter.

Optional compare operation 606 compares the constrained color parameters to colors for the same styles in one or more example templates, such as template 310. In one embodiment, a matching engine, such as matching engine 506, compares the color settings of the constrained color parameters and the example templates. The matching engine may compare the absolute value of the hue setting between colors for the same style in the constrained parameters and the example template. In another embodiment, the matching engine compares the offsets between two color settings in the constrained parameters and the example template. Select operation 608 selects one or more example templates, such as template example 314, that best match the color constraints, whether the match is by hue or relationship offset.

Apply operation 610 applies each of the selected example templates to the color constraints. In one embodiment, each relationship between a base color and the other colors in the example template is determined. In a further embodiment, the relationship is determined by the offset in degrees between the base color and the other colors. The relationship is then applied to the "base color" in the constrained color parameters to extrapolate other colors. These other colors are used to set the color hue values for the colors not set by the user. Optional create operation 612 then bundles the constrained color parameters and the extrapolated colors into one or more color palettes to create one or more color template choices, such as template choices 320.

Present operation 614 then presents the template choices to the user. In one embodiment, the user is provided with one or more graphical representations of their document with the template choices applied, such as choices 320. In another embodiment, the colors are provided in a palette, such as the palettes in window 120, for the user to view on the UI. Optional receive operation 616 receives the choice of template from the user. In one embodiment, the user selects the desired template choice using an interface device, such as a mouse, from a window, such as window 120.

Optional apply operation 618 applies the colors to the document. In embodiments of the present invention, the style settings are assigned to portions of the document having the particular style. Thus, if a portion of text has the style "normal," that portion of text is colored using the color in the color template set for the "normal" style. If the color was extrapolated, the text's color changes to the extrapolated color. In one embodiment, the user selects a control, such as control 130, to apply the color template. After coloring all the portions of the document, the formatted document is presented to the user. In one embodiment, the document is shown in a UI window, such as window 108.

In embodiments of the present invention, software classes are provided to extrapolate the color template from one or more constrained color parameters. The ColorServices class provides objects that interface with the system and call into the color template generation engine. Other objects in the ColorServices class manage the interface with the example template library. Still other objects in the ColorServices class move data through the matching engine and the algorithm engine.

The ColorTemplate class provides data objects that define the styles template "color template," in the style template In some embodiments, the data objects include fields for background, subtle, emphasis, and standard (normal) color entries. The objects in the ColorTemplate class can define the color palette derived for input from the user, the color palette derived from the example template library, or the color palette from the extrapolated colors from the color template generation engine. In some embodiments, the ColorTemplate objects define and store the user input, define the color for each example template in the library, and define the output color for each suggested output template.

The ColorTemplateElement class provides objects under the ColorTemplate class that define one parameter in the color template, such as the color setting for the style "subtle."ColorTemplateElement can include an actual color setting or it may be marked as "unknown,"such as when the user is asking for the color value to be extrapolated.

The ColorRelationship class provides objects under the ColorTemplate class that define the relationship between two color entries. In one embodiment, the ColorRelationship objects define relationships such as monochromatic, analogous, and complementary. One skilled in the art will recognize that other color relationships are possible and included within the scope of this invention. In some embodiments, the ColorRelationship objects include data for the "color offset" that can define how close the actual relationship between two colors meets a standard type of relationship, such as complementary. The "color offset" data type is used to compare and match the color templates defined in two ColorTemplate objects and is used to extrapolate colors in the algorithm engine.

In extrapolating a color template, ColorServices is called by the UI and receives a ColorTemplate object that represents the user chosen color template. ColorServices retrieves one or more ColorTemplate objects representing example color templates from a template library. The two ColorTemplate objects are sent to a matching function. The matching function compares the ColorTemplateElement objects set by the user in the user-created ColorTemplate to the corresponding ColorTemplateElement in the ColorTemplate retrieved from the library. In further embodiments, if two ColorTemplateElements have been set, the matching function may compare the ColorRelationship settings in the two ColorTemplates. In one embodiment, the matching function calculates the distance between the ColorRelationships or the ColorTemplateElements. The matching function outputs one or more ColorTemplate objects representing example color templates that most closely compare to the ColorTemplate received from the user.

ColorServices pass the one or more example ColorTemplates from the library to an algorithm or extrapolating function. The ColorRelationship settings in the example ColorTemplate are extracted and applied or assigned to the ColorRelationship object in the ColorTemplate object provided from the user. The ColorRelationship setting outputs a suggested output ColorTemplate. The user selects a suggested output ColorTemplate, which is provided to the application to color the document with the data within the ColorTemplate.

Although the present invention has been described in language specific to structural features, methodological acts, and computer-readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A method for creating a color template for a document, the method comprising:
   receiving at least one color for the document;
   constraining at least one document parameter to the at least one color to generate at least one constrained color parameter;
   automatically comparing the at least one constrained color parameter to one or more example color templates;
   automatically selecting one or more of the example color templates based on the comparison;
   automatically applying the selected one or more example color templates to the at least one constrained color parameter to extrapolate one or more other colors for unset document parameters;
   providing the color template based on the received colors and the extrapolated colors.

2. The method of claim 1, wherein automatically comparing comprises:
   comparing one or more constrained parameters to one or more attributes of one or more example color template in a template example library.

3. The method of claim 2, wherein a constrained parameter is one of a color setting or a relationship between two color settings.

4. The method of claim 3, wherein the color setting is a value for hue.

5. The method of claim 1, wherein automatically applying comprises:
   determining one or more relationships between a base color, corresponding to the at least one constrained color parameter, and a second color; and
   applying the one or more relationships to the constrained color parameter corresponding to the base color to extrapolate one or more new colors related to the second color.

6. The method of claim 1, further comprising:
   receiving selection of the color template; and
   automatically applying the coloring to one or more portions of the document based on the color template.

7. The method of claim 6, wherein one or more colors set by the user are changed when automatically applying the coloring.

8. The method of claim 1, wherein two or more applications apply the color template to color portions of documents generated by the two or more applications.

9. The method of claim 1, further comprising:
receiving a user created document having one or more colors;
extracting the color settings from the user created document; and
providing the extracted color settings as the at least one color for the document.

10. The method of claim 1, wherein automatically selecting comprises
automatically selecting one or more example color templates that closely compare to the at least one constrained color parameter.

11. A computer system for creating a color template for a document, the system comprising:
a matching engine that receives one or more constrained color parameters and compares the one or more constrained color parameters to one or more colors of one or more example color templates and extracts one or more example color templates that relate to one or more of the constrained color parameters;
an algorithm engine that applies the color relationships in the one or more example color templates to the constrained color parameters to extrapolate one or more color templates; and
a template application module that receives a choice of a color template and automatically applies the chosen color template to the document.

12. The system of claim 11, further comprising a color template example library where the matching engine extracts the one or more example color templates.

13. The system of claim 11, wherein the matching engine calculates a mathematical distance between the constrained color parameter and the one or more colors of the one or more example color templates.

14. The system of claim 13, wherein the mathematical distance is between two hue settings for two colors.

15. The system of claim 13, wherein the mathematical distance is between offsets for two sets of two colors having a relationship.

16. The system of claim 11, wherein the algorithm engine determines one or more relationships between a base color, corresponding to one of the constrained color parameters, in the color template and a second color and applies the one or more relationships to the constrained color parameter corresponding to the base color to extrapolate one or more new colors related to the second color.

17. A computer storage medium encoding a computer program of instructions for executing a computer implemented method for creating a color template for a document, the method comprising:
receiving at least one color for the document;
constraining at least one document parameter to the at least one color, to generate at least one constrained color parameter;
comparing the at least one constrained color parameter to one or more attributes of one or more example color templates in a template example library;
automatically selecting one or more example color templates based on the comparison;
receiving a selection of one of the one or more example color templates;
automatically applying the selected example color template to the constrained color parameters to extrapolate one or more other colors for unset document parameters; and
providing the selected example color template based on the received colors and the extrapolated colors.

18. A computer storage medium defined in claim 17, wherein the constrained color parameter is one of a color setting or a relationship between two color settings.

19. A computer storage medium defined in claim 18, wherein the color setting is a value for hue.

* * * * *